(12) United States Patent
Rohrer et al.

(10) Patent No.: US 12,465,054 B2
(45) Date of Patent: Nov. 11, 2025

(54) SYSTEM FOR CONVEYING PASTA

(71) Applicant: Bühler AG, Uzwil (CH)

(72) Inventors: Patrick Rohrer, Henggart (CH); Mirjam Hugentobler, Oberuzwil (CH); Simon Kast, Uzwil (CH)

(73) Assignee: Bühler AG, Uzwil (CH)

( * ) Notice: Subject to any disclaimer, the term of this patent is extended or adjusted under 35 U.S.C. 154(b) by 123 days.

(21) Appl. No.: 18/044,450

(22) PCT Filed: Aug. 20, 2021

(86) PCT No.: PCT/EP2021/073109
§ 371 (c)(1),
(2) Date: Mar. 8, 2023

(87) PCT Pub. No.: WO2022/053286
PCT Pub. Date: Mar. 17, 2022

(65) Prior Publication Data
US 2023/0320366 A1      Oct. 12, 2023

(30) Foreign Application Priority Data
Sep. 10, 2020   (EP) .................................. 20195589

(51) Int. Cl.
*A21C 9/02*       (2006.01)
*B65G 47/71*     (2006.01)
*B65G 47/82*     (2006.01)

(52) U.S. Cl.
CPC ............... *A21C 9/02* (2013.01); *B65G 47/71* (2013.01); *B65G 47/82* (2013.01)

(58) Field of Classification Search
None
See application file for complete search history.

(56) References Cited

U.S. PATENT DOCUMENTS 533,443 A * 2/1895 Dejonge .................. B05C 3/10
                                                     198/465.4
2,472,354 A    6/1949 Waters
                            (Continued)

FOREIGN PATENT DOCUMENTS

CN        101223893 A      7/2008
FR        1 072 391           5/1953
                            (Continued)

OTHER PUBLICATIONS

Japanese Office Action Corresponding to 2023-515855 mailed Feb. 6, 2024.
(Continued)

*Primary Examiner* — William R Harp
(74) *Attorney, Agent, or Firm* — Finch & Maloney PLLC (57)   ABSTRACT

The present invention is related to a conveyor system (1) for a plant for producing elongated pasta, for example spaghetti, with a transfer unit (3) for transferring conveyor elements (4) from a first conveyor unit (2*a*) to a second conveyor unit (2*b*), the transfer unit (3) comprising a rotatably mounted cam element (3*a*) with a gripping device (3*b*) and a fixedly arranged guide element (3*c*) with an approximately circular-segment-shaped surface section (3*d*), which are arranged relative to each other in such a way that a conveyor element (4) taken over by the gripping means (3*b*) of the cam element (3*a*) from the first conveyor unit (2*a*) can be moved by rotation of the cam element (3*a*) along the approximately circular-segment-shaped surface portion (3*d*) of the guide element (3*c*) to a position where the conveyor element (4) can be taken over by the second conveyor unit (2*b*). The present invention further relates to a plant (A) for the production of elongated pasta and to a method for conveying elongated pasta.

14 Claims, 7 Drawing Sheets

(56) References Cited

U.S. PATENT DOCUMENTS

| | | | |
|---|---|---|---|
| 2,583,847 A | | 1/1952 | Hummel |
| 2,965,214 A | | 12/1960 | Schlumpf et al. |
| 3,472,354 A | * | 10/1969 | Locatelli ............... F26B 15/126 |
| | | | 198/607 |
| 5,309,827 A | * | 5/1994 | Manser ................... F26B 21/06 |
| | | | 34/570 |

FOREIGN PATENT DOCUMENTS

| | | |
|---|---|---|
| GB | 1 048 163 | 11/1996 |
| JP | S45-023723 | 9/1970 |
| JP | S62-190485 U | 12/1987 |
| JP | H07-039293 A | 2/1995 |
| KR | 10-2012-0100219 A | 9/2012 |

OTHER PUBLICATIONS

European Search Report Corresponding to EP 20195589.5 mailed Jan. 21, 2021.
International Search Report Corresponding to PCT/EP2021/073109 mailed Nov. 10, 2021.
Written Opinion Corresponding to PCT/EP2021/073109 mailed Nov. 10, 2021.

* cited by examiner

SYSTEM FOR CONVEYING PASTA

The present invention relates to a system for conveying pasta products that provides continuous and gentle conveying.

Pasta is usually picked up after pressing by conveyor units, which are used to convey it through a pasta dryer. For example, long pasta, such as spaghetti, is hung on rods whose ends are loosely picked up by chain links of a chain conveyor.

In plants for the production of elongated pasta, for example spaghetti, it is necessary to transfer the pasta from one conveyor unit to another conveyor unit. For example, for space reasons drying units of such plants are designed in such a way that the pasta passes through the space inside the drying unit several times with the help of different conveyor units. Furthermore, the pasta produced by for example extrusion must be conveyed to a cutting unit and transferred to the same.

Particularly when wet, pasta is exceptionally sensitive to impacts, vibrations or other jerky movements. Transferring pasta from one conveyor unit to another must therefore be done with great care to avoid damaging the pasta.

This problem has not yet been satisfactorily solved in the state of the art.

The transfer of the pasta (or the bars from which the pasta is suspended) from one conveyor unit to the next requires precise coordination of the movement of the individual conveyor units. Usually, this coordination requires that a conveyor unit is moved intermittently: Only when the preceding conveyor unit has conveyed the element to be conveyed (for example, a rod with pasta suspended therefrom) to a certain position does the following conveyor unit start moving. This is described, for example, in GB-1,048,163.

Such conveying is disadvantageous for various reasons. When the element to be conveyed (for example, a rod with pasta suspended therefrom) is transferred from the first conveyor unit (for example, a pendulum chain or a chain conveyor) to the subsequent, stationary conveyor unit (for example, a chain conveyor), the element to be conveyed experiences an initial impact. The downstream conveyor unit now starts moving and conveys the element to a next transfer point (for example, a downstream conveyor unit such as a stripper chain of a cutting machine), where the element experiences another impact during the transfer. The conveyor units (chain conveyor, stripper chain) are moved intermittently (i.e. in stop-and-go operation) in this case. The jerky start-up of the conveyor units causes impacts on the element to be conveyed, is time-consuming compared to continuous operation, and places a load on the electrical components. In technical use, such a system allows conveying of about 11-12 bars (with pasta suspended therefrom) per minute and per machine.

U.S. Pat. No. 2,965,214 A describes a continuous conveyor system in which elements to be conveyed are transferred from one conveyor chain to a subsequent conveyor chain by means of a rotating disc with gripping elements. The rotating disc is positioned symmetrically between the conveyor chains and is operated by means of a planetary gear to prevent abrupt changes in direction of the gripping elements arranged on the rotating disc. However, this conveyor system requires a lot of space, which makes its installation in a plant for the production of elongated pasta challenging. In addition, the geometrical arrangement of the transfer unit is challenging and requires extreme precision, making its installation time-consuming.

In U.S. Pat. No. 3,472,354 a conveyor system is described in which the transfer of conveyor elements from one conveyor chain to a subsequent conveyor chain is carried out with the aid of a transfer arm unit. This conveyor system also includes a planetary gear unit with the disadvantages described above.

It was the problem of the present invention to provide a conveyor system for a plant for the production of elongated pasta such as spaghetti, which overcomes the disadvantages of the prior art and, in particular, enables a smooth, efficient and continuous transfer of conveyor elements from one conveyor unit to another conveyor unit without abrupt changes of direction.

This problem is solved by the conveyor system according to the invention.

The present invention relates to a conveyor system for a plant for the production of elongated pasta, for example spaghetti, comprising a first conveyor unit and a second conveyor unit as well as a transfer unit for transferring conveyor elements from the first conveyor unit to the second conveyor unit, characterized in that the transfer unit comprises a rotatably mounted cam element with a gripping device and a fixedly arranged guide element with an approximately circular-segment-shaped surface section, wherein the cam element and the guide element are arranged relative to each other in such a way that a conveyor element taken over from the first conveyor unit by the gripping means of the cam element can be moved by rotation of the cam element along the approximately circular-segment shaped surface portion of the guide element to a position where the conveyor element can be taken over by the second conveyor unit.

With the conveying system according to the invention, conveying is achieved in which no impacts or vibrations are exerted on the product to be conveyed (e.g. pasta). The product to be conveyed is thus subjected to significantly less stress, so that any product loss occurring during conveying can be reduced or completely avoided.

Conveying takes place without abrupt changes of direction and can be carried out continuously, which is particularly advantageous. This avoids the time losses associated with an intermittent conveying process and increases the performance of the conveying system.

For example, in the case of conveying bars loaded with pasta to a cutting machine, the conveying capacity can be increased from about 11-12 bars per minute in conventional systems to 15 bars per minute in the system according to the invention. In the case of a double cutting machine that is preferred according to the invention, this means an increase in output from 22-24 bars per minute to 30 bars per minute.

The conveyor system according to the invention can be used for any transport steps of elongated pasta such as spaghetti. For example, the transport of elongated pasta in a dryer, to a cutting machine, to a depositing table or to a distributor may be mentioned. In accordance with the invention, the conveyor system according to the invention is preferably used for the transport of elongated pasta to a cutting machine, particularly preferably for the distribution transport of elongated pasta to two units of a double cutting machine.

The essential element of the conveying system according to the invention is a transfer unit. With the transfer unit, the transfer of conveyor elements from a first conveyor unit to a second conveyor unit is achieved.

The conveyor elements are preferably rods for conveying elongated pasta. Preferably, the elongated pasta is suspended from the rods.

Conveyor units for transporting conveyor elements such as the above-mentioned rods are known. Preferably, these are transport chains with carriers arranged uniformly on the chains. Such transport chains are known and need not be explained in detail here. For example, the transport chains used according to the invention may at least partially be pendulum chains. The conveyor elements are driven in a known manner by means of a motor, preferably by means of a servomotor. The motor can, for example, drive a wheel around which the conveyor element, such as a transport chain, is guided.

The carriers are known elements, each of which can receive a rod and hold it in a horizontal position while the rod is moved by the conveyor element.

The transfer unit according to the invention comprises a cam element and a guide element. According to the invention, a cam element is understood to be a disc-shaped component with a curved (non-uniform) circumferential surface. Circular discs are not included. The dimensions of the cam element depend on the dimensions of the conveyor system and are to be selected in such a way that it can fulfill the function described below.

The cam element may preferably be in the form of a segment of a circle, for example an eighth segment of a circle.

The cam element is arranged rotatably and has a gripping device. The rotatable arrangement can be realized in a known manner, for example by arranging the cam element on a shaft. The shaft is preferably driven by means of a motor, preferably by means of a servomotor.

The gripping device is preferably a recess in the cam element which is partially open towards the circumferential surface of the cam element, and which has such a shape that it can receive the conveyor element described above, preferably a rod carrying elongated pasta, in such a way that the conveyor element does not experience any impacts or vibrations during transport through the transfer unit. This is preferably achieved by the shape of at least a portion of the gripping device corresponding to the shape of the conveyor element, i.e. the conveyor element can pass through the opening of the gripping device into the portion of the same which corresponds to the shape of the conveyor element. For example, the gripping device may have a first section with a substantially parallelepipedal cross-section, which is open at least in sections towards the circumferential surface of the cam element. This first section with a substantially parallelepipedal cross-section is adjoined, in this exemplary embodiment, by a second section with a substantially semi-circular section directly connected to the first section, which second section corresponds to the shape of the conveyor element and can receive the conveyor element as described above.

Preferably, the gripping device and the rotatable bearing (for example on a shaft) are arranged at opposite ends of the cam element.

The transfer unit according to the invention further comprises a guide element. The guide element serves to guide the conveyor element picked up by the cam segment along a fixed path and to prevent the conveyor element from sliding out of the gripping device of the cam element when the cam element rotates. Since the cam element traverses a circular path during its rotation, the guide element has a corresponding approximately circular segment-shaped surface in a section facing the cam element, which serves as a guide for the conveyor element. For example, the conveyor element can be cuboid-shaped with a circular segment-shaped recess in the surface section associated with the cam element. The guide element is fixed in the conveyor system, i.e. it does not move during the conveying process.

The cam element and the guide element are arranged relative to one another in such a way that a conveyor element located in the gripping device of the cam element comes into contact with the approximately circular-segment-shaped surface section of the guide element during the circular movement of the cam element. The conveyor element is moved on the approximately circular-segment-shaped surface portion of the guide element with the aid of the gripping device, for example, in the case of a recess as a gripping device, by the end of the recess facing away from the direction of movement of the cam element, which end abuts against the conveyor element during the movement and presses it in the direction of rotation of the cam element.

The cam element and the guide element can be offset from each other so that the cam element is moved in front of or behind the guide element during its rotational movement.

In order to ensure the above function, the positions and dimensions of the cam element and the guide element associated with the same must be selected in such a way that a conveyor element located in the gripping device of the cam element can be moved precisely along the approximately circular-segment-shaped surface section of the guide element during the rotational movement of the cam element.

Preferably, the approximately circular-segment-shaped surface portion of the guide member is a circular segment at an angle of 45-75° of a circle with the axis of rotation of the cam member as the center.

A second conveyor unit, preferably a transport chain, takes over the conveyor element at the end or near one end of the approximately circular-segment-shaped surface section of the guide element and then moves the conveyor element away from the transfer unit. The second conveyor unit preferably also has carriers as described above.

In order to ensure continuous operation, the movements of the first conveyor unit and the transfer unit must be coordinated in such a way that a carrier of the first conveyor unit and the gripping device of the transfer unit arrive simultaneously at a transfer point. According to the invention, this transfer point is referred to as the first transfer point P1. If this carrier of the first conveyor unit conveys a conveyor element, this conveyor element can be taken over at the first transfer point P1 by the gripping device of the transfer unit in a continuous movement without impacts or vibrations being exerted on the conveyor element.

Furthermore, the movements of the second conveyor unit and the transfer unit are to be coordinated in such a way that a carrier of the second conveyor unit and the gripping device of the transfer unit arrive simultaneously at a transfer point. According to the invention, this transfer point is referred to as second transfer point P2. If the gripping device of the transfer unit conveys a conveyor element, this conveyor element can be taken over at the second transfer point P2 by a carrier of the second conveyor unit of a continuous movement without impacts or vibrations being exerted on the conveyor element.

According to the invention, this is preferably achieved by moving the first and second conveyor units at a constant speed in each case while the cam plate element traverses a specific movement curve. This movement curve is characterized by the fact that the cam element with the gripping device has a rotational speed at the transfer points P1 and P2 which corresponds essentially, preferably exactly, to the speed of the corresponding conveyor unit at this transfer point. Between the transfer points, the cam element is accelerated in order to be at the corresponding transfer point in time with the gripping device for taking over or transferring a conveyor element. The acceleration profile must be adapted to the speeds of the conveyor units. For example, the cam element can pass through an area with a lower acceleration directly after a transfer point and then be moved in a subsequent area with a higher acceleration.

The conveyor units can be arranged in such a way that they convey a conveyor element vertically or horizontally away from the transfer unit. Preferably, the conveyor element is conveyed vertically away from the transfer unit.

In accordance with the invention, the conveyor system according to the invention is preferably used for conveying elongated pasta, for example spaghetti, to a cutting machine. According to this embodiment, the first conveyor unit is a pendulum chain which conveys the elongated pasta (preferably suspended from a rod) from a stacker unit vertically downwards to the transfer unit of the conveying system according to the invention described above. By means of the transfer unit, the elongated pasta (preferably suspended from a rod) is transported to a second conveyor unit, which is a stripper chain and from which the elongated pasta (preferably suspended from a rod) is transported vertically upwards to a deposit table of a cutting machine.

In accordance with the invention, the conveyor system is particularly preferred in a double cutting machine.

A double cutting machine (or a system for the production of elongated pasta, for example spaghetti, with two cutting modules) is known.

In this particularly preferred embodiment, the transfer unit of the conveying system according to the invention has a first and a second cam element and a first and a second guide element, each with an approximately circular-segment-shaped surface section. A second conveyor unit is associated with each cam element, wherein the first cam element and the first guide element as well as the second cam element and the second guide element are arranged relative to one another in such a way that a conveyor element taken over by the gripping device of the respective cam element from the first conveyor unit can be moved by rotation of the respective cam element along the approximately circular-segment-shaped surface section of the respectively associated guide element to a position where the conveyor element can be taken over by the second conveyor unit.

In other words, the conveyor elements, for example bars with elongated pasta suspended therefrom, are distributed from the transfer unit to the two cutting machines by transferring the conveyor elements from the first conveyor unit alternately to the first cam element and the second cam element and transporting them to the corresponding second conveyor unit.

Preferably, in this embodiment, the first and second cam elements and the first and second guide elements are arranged axially symmetrically about the first conveyor unit, i.e., with the aid of a mirror plane mentally laid through the first conveyor unit, the first cam element and the first and second guide elements can be mapped by mirroring onto the positions of the second cam element and the second guide element.

In this preferred embodiment, the first and second conveyor units, the transfer unit and the conveyor elements are preferably as described above.

In this preferred embodiment, the two cam elements are moved in opposite directions to each other. For example, the first cam element can be rotated clockwise and the second cam element counterclockwise. Preferably, the rotational movements of the two cam elements are coordinated such that when the gripping means of the first cam element is located at the first transfer point P1, the gripping means of the second cam element is located at the second transfer point P2, and vice versa. It is essential that the movement of the first cam element and the second cam element are coordinated with each other in such a way that the first cam element does not collide with the second cam element, and furthermore that neither of the cam elements collides with the first or second conveyor unit.

The cam elements preferably run through the same movement curves as described above, i.e. the respective cam element with the gripping device has a rotational speed at the transfer points P1 and P2 which corresponds essentially, preferably exactly, to the speed of the corresponding conveyor unit at this transfer point. Between the transfer points, the respective cam element is accelerated in order to be in time with the gripping device at the corresponding transfer point for taking over or transferring a conveyor element. The acceleration profile is to be adapted to the speeds of the conveyor units. For example, the respective cam element can pass through an area with a lower acceleration directly after a transfer point in order to then be moved in a subsequent area with a higher acceleration.

The present invention also relates to a plant for the production of elongated pasta, for example spaghetti, comprising a conveying system according to the invention as described herein.

Such plants are known. According to the invention, the plant is preferably a double cutting machine, or a plant for the production of elongated pasta, for example spaghetti, with two cutting modules. The conveying system according to the invention is then preferably designed as described above in such a way that it distributes the elongated pasta uniformly to the two cutting modules.

The present invention further relates to a method for conveying elongated pasta, for example spaghetti, with a conveying system according to the invention, comprising the steps:
a) Conveying a conveyor element carrying the elongated pasta by means of a first conveyor unit to a first transfer point,
b) Transfer of the conveyor element from the first conveyor unit by a transfer unit and conveying of the conveyor element to a second transfer point,
c) Transfer of the conveyor element at the second transfer point from the transfer unit by a second conveyor unit, characterized in that in step b) the conveyor element is taken over at the first transfer point by the gripping device of the cam element of the transfer unit, and the conveying of the conveyor element to a second transfer point takes place along the approximately circular-segment-shaped surface section of the guide element of the transfer unit.

The details of this method have already been described above.

As described above, the rotational speed of the cam element and the conveying speeds of the first conveyor unit and the second conveyor unit are preferably matched to each other in such a way that at the first transfer point and at the second transfer point the gripping device can pick up the conveyor element from the first conveyor unit or deliver it to the second conveyor unit (2a) in a continuous process. In this way, impacts or vibrations on the conveyor element are reduced or completely avoided.

Preferably, the conveying element is transported by the second conveyor unit to a cutting machine, i.e. the invention is used in a plant described above.

As described above, the motion of the first cam element and the second cam element are coordinated such that the first cam element does not collide with the second cam element.

According to a preferred embodiment, at the first the conveying speed of the first conveyor unit is 50% of the rotational speeds of the cam elements, with the cam elements rotating in opposite directions at the same speed. The rotational speeds of the cam elements are here average speeds when the cam elements are operated with the preferred motion curve as described above.

The present invention has the advantage that, in the case of the preferred embodiment of use in a double cutting machine, in the event of a malfunction, the rotation of that cam element which is located in the conveyor path subject to the malfunction is stopped. In other words, in the event of a malfunction, the cutting module not affected by the malfunction can still be supplied with pasta, and the downtime of the system is reduced.

In the event of a malfunction, the conveying speed of the first conveyor unit is preferably reduced by 50%, since the conveyor elements are no longer to be distributed alternately to the two cutting modules, but only one cutting module is to be supplied with all conveyor elements. In order for the cam element, which is still in operation, to be able to take over all conveyor elements, the speed of the first conveyor unit must be adjusted accordingly.

The present invention is explained in more detail below with reference to non-limiting examples and drawings, which show the following.

Identical reference signs designate the same components in different figures.

Figure 1:
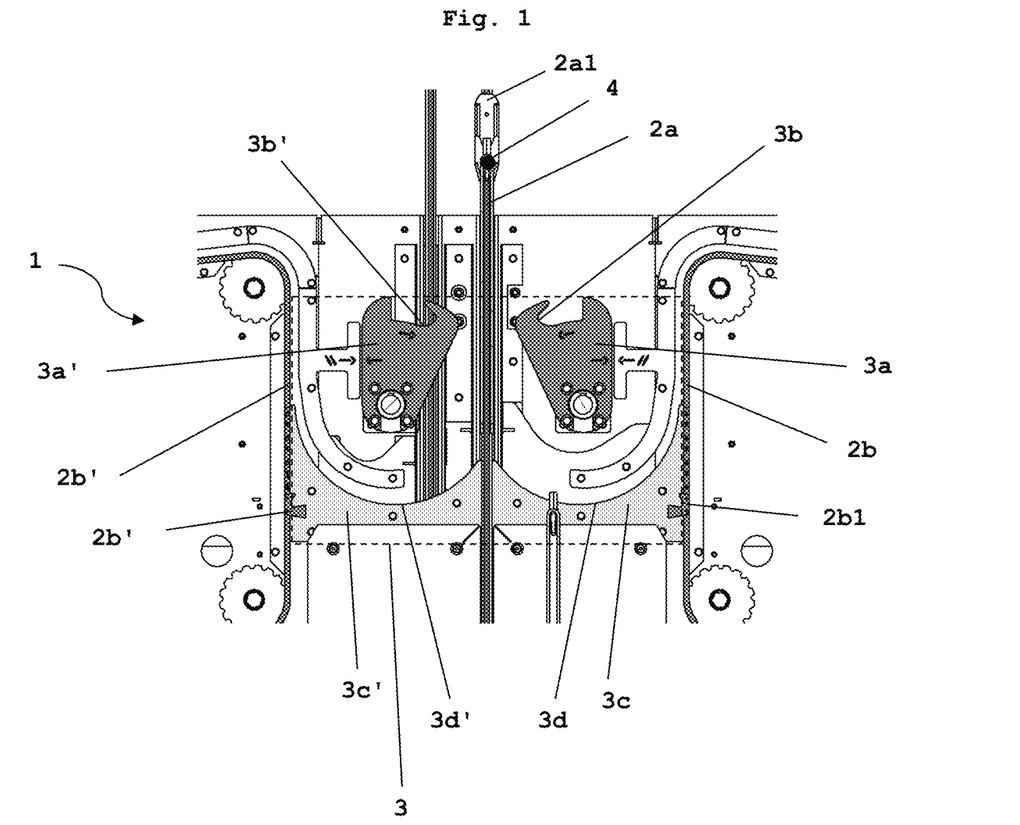
FIG. 1 a schematic view of an embodiment of the conveyor system according to the invention FIG. 2*a* a schematic view of an embodiment of the conveying system according to the invention in an initial position of conveying FIG. 2*b* a schematic view of an embodiment of the conveying system according to the invention in a first intermediate position of conveying FIG. 2*c* a schematic view of an embodiment of the conveying system according to the invention in a second intermediate position of conveying FIG. 2*d* a schematic view of an embodiment of the conveying system according to the invention in a third intermediate position of conveying FIG. 3 a movement curve of a cam element of an embodiment of the conveyor system according to the invention FIG. 4 a schematic view of an embodiment of a plant for the production of elongated pasta according to the invention.

FIG. 1 shows a schematic view of an embodiment of the conveyor system (1) according to the invention. This is a conveyor system for transporting conveyor elements (4) to two cutting modules (not shown).

The conveyor system 1 comprises a first conveyor unit 2*a*, for example a pendulum chain, and a second conveyor unit 2*b*, for example a stripper chain, as well as a transfer unit 3 for transferring conveyor elements 4, for example bars with elongated pasta suspended therefrom, from the first conveyor unit 2*a* to the second conveyor unit 2*b*.

The transfer unit 3 has a first and a second cam element 3*a*, 3*a*' as well as a first and a second guide element 3*c*, 3*c*', each having an approximately circle-segment-shaped surface section 3*d*, 3*d*', the approximately circle-segment-shaped surface sections 3*d*, 3*d*' facing the respective cam element 3*a*, 3*a*'. A second conveyor unit 2*b*, 2*b*' is associated with each cam element 3*a*, 3*a*', wherein the first cam element 3*a* and the first guide element 3*c* as well as the second cam element 3*a*' and the second guide element 3*c*' are arranged with respect to each other in such a way that a conveyor element 4 taken over from the first conveyor unit 2*a* by the gripping means 3*b*, 3*b*' of the respective cam element 3*a*, 3*a*' can be moved by rotation of the respective cam element 3*a*, 3*a*' along the approximately circular-segment-shaped surface section 3*d*, 3*d*' of the respectively associated guide element 3*c*, 3*c*' to a position where the conveyor element 4 can be taken over by the second conveyor unit 2*b*, 2*b*'.

The first conveyor element 2*a* has evenly spaced carriers 2*a*1, each of which can receive and transport a conveyor element (4).

The second conveyor element 2*b*, 2*b*' has evenly spaced carriers 2*b*1, 2*b*'1, each of which can receive and transport a conveyor element 4.

In the embodiment according to FIG. 1, the first and second cam elements 3*a*, 3*a*' and the first and a second guide element 3*c*, 3*c*' are arranged axially symmetrically around the first conveyor unit 2*a*.

FIGS. 2*a* to 2*d* schematically illustrate an embodiment of the method according to the invention using the conveyor system 1 shown in FIG. 1.

Figure 2A:
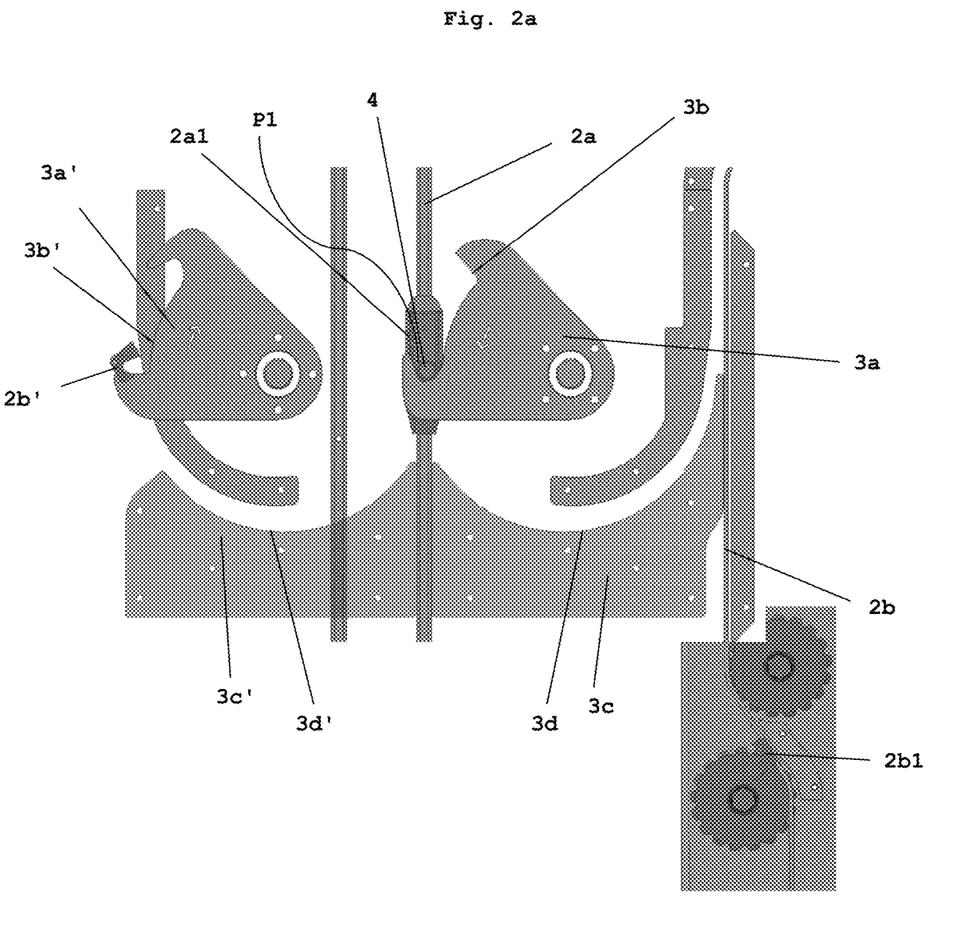

In an initial position shown in FIG. 2*a*, the gripping device 3*b* of the first cam element 3*a* is located at the first transfer point P1. At the same time, a carrier 2*a*1 of the first conveyor unit 2*a* is located at the first transfer point P1. The carrier 2*a*1 carries a conveyor element 4, which is taken over at the first transfer point P1 by the gripping device 3*b* of the cam element 3*a* in a preferably continuous movement.

The gripping device 3*b*' of the second cam element 3*a*' is located at the second transfer point P2 at this time. At the same time, a carrier 2*b*1' of the second conveyor unit 2*b*' (not shown here) is located at the second transfer point P2, but does not carry a conveyor element 4.

Figure 2B:
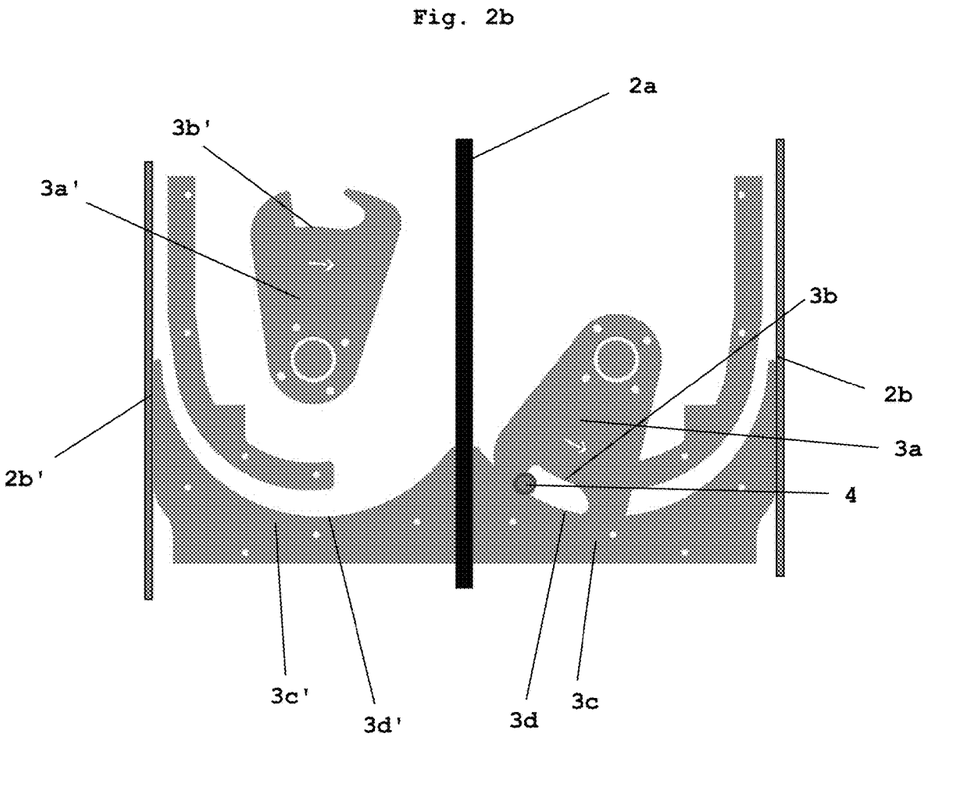

In the position shown in FIG. 2*b*, both cam elements 3*a*, 3*a*' have been rotated by approximately 70°, with the first cam element 3*a* being rotated counterclockwise and the second cam element 3*a*' clockwise. The gripping device 3*b* of the first cam element 3*a* is now located above the approximately circular segment-shaped surface section 3*d* of the first guide element 3*c*. The conveyor element 4 is moved along the approximately circular-segment-shaped surface section 3*d* of the first guide element 3*c*, being pushed by the end of the gripping device 3*b* facing away from the direction of rotation.

Figure 2C:
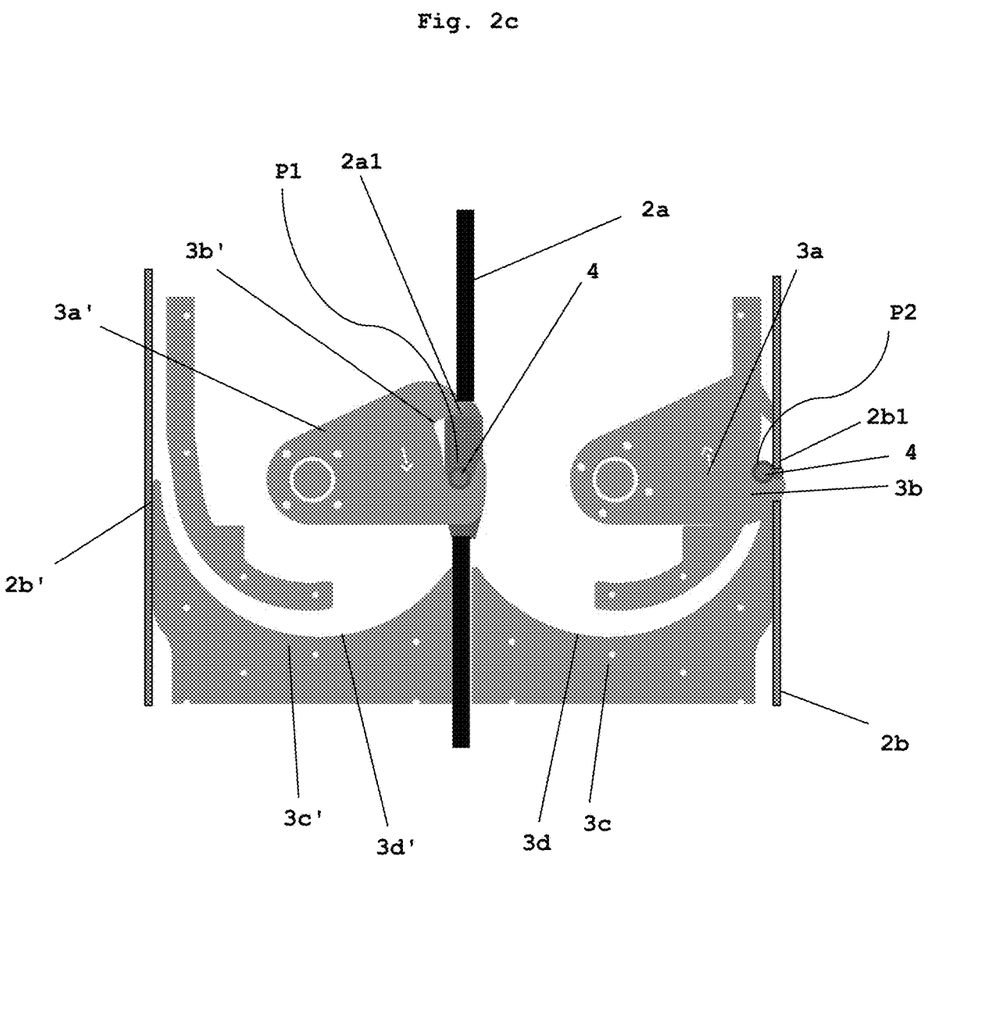

In the position shown in FIG. 2*c*, both cam elements 3*a*, 3*a*' have been rotated by about 105° compared to the position shown in FIG. 2*b*, with the first cam element 3*a* being rotated counterclockwise and the second cam element 3*a*' being rotated clockwise. The gripping device 3*b* of the first cam element 3*a* is now located at the second transfer point P2. At the same time, a carrier 2*b*1 of the second conveyor unit 2*b* is located at the second transfer point P2. The gripping device 3*b* of the first cam element 3*a* carries the conveyor element 4, which is picked up at the second transfer point P2 by the carrier 2*b*1 of the second conveyor unit 2*b* in a preferably continuous movement. At the same time, the gripping device 3*b*' of the second cam element 3*a*' is located at the first transfer point P1. At the same time, a carrier 2*a*1 of the first conveyor unit 2*a* is located at the first transfer point P1. The carrier 2*a*1 carries a conveyor element 4, which is picked up at the first transfer point P1 by the gripping device 3*b*' of the second cam element 3*a*' in a preferably continuous movement.

Figure 2D:
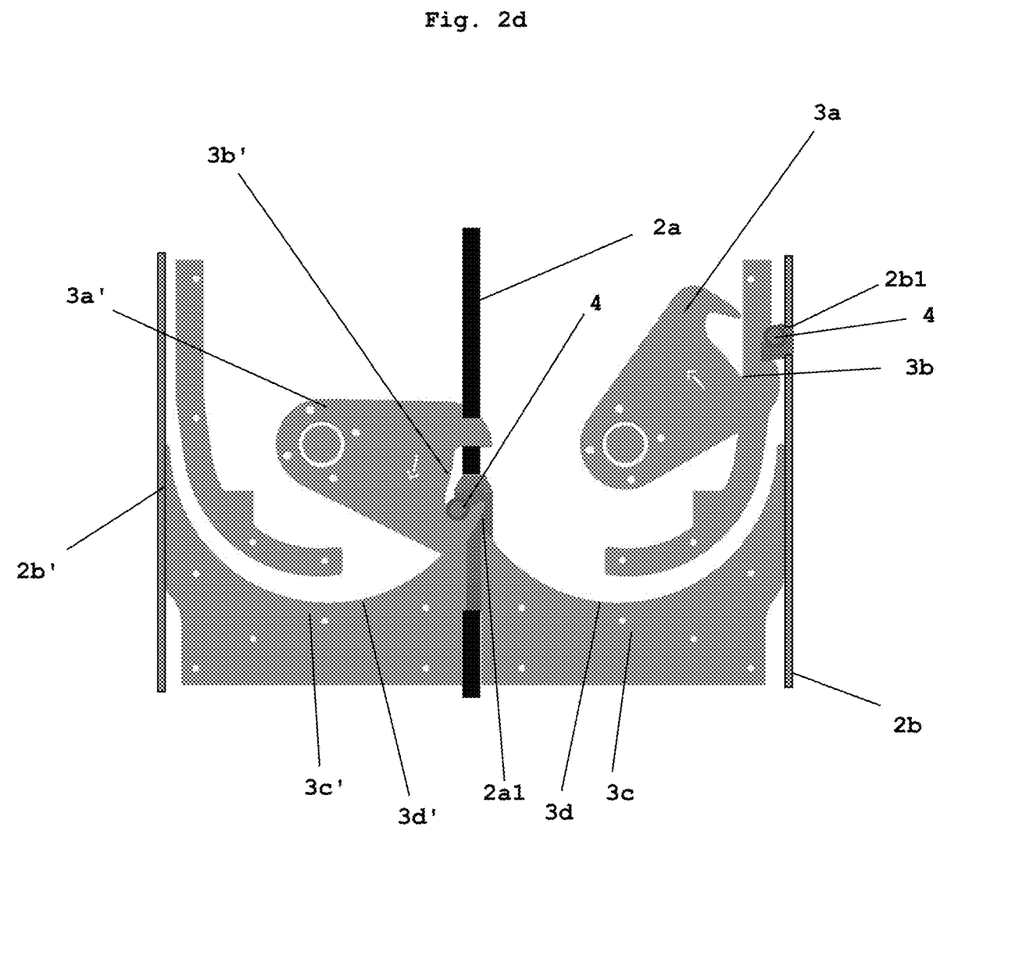

In the position shown in FIG. 2d, both cam elements 3a, 3a' have been rotated a little further compared to the position shown in FIG. 2c, with the first cam element 3a being rotated counterclockwise and the second cam element 3a' being rotated clockwise. The first cam element 3a has transferred its conveyor element 4 to the second conveyor unit 2b, which transports the conveyor element 4 vertically upwards to a cutting module (not shown). The second cam element 3a' has taken over a conveyor element 4, and its gripping device 3b' comes into contact with the approximately circular-segment-shaped surface section 3d' of the second guide element 3c', where it subsequently performs the conveyance described in FIG. 2b for the first cam element 3a.

Figure 3:
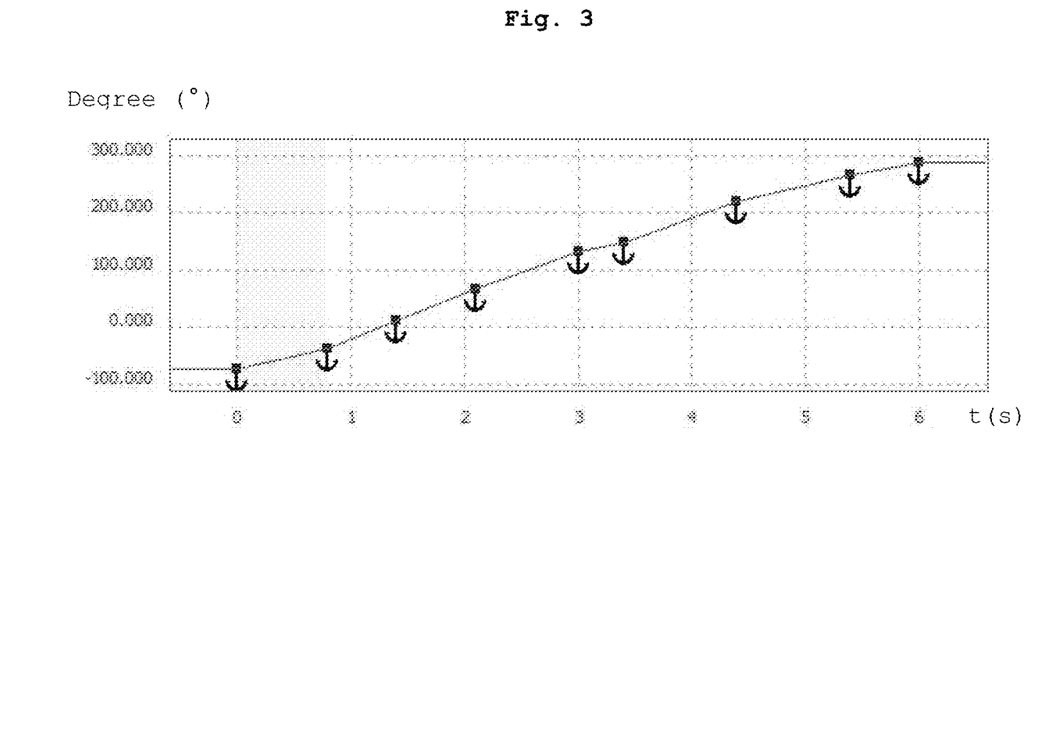

FIG. 3 illustrates a movement curve of a cam element 3a, 3a' of an embodiment of the conveyor system 1 according to the invention. At the time t=0 s, the gripping device 3b, 3b' of the cam element 3a, 3a' is located at the second transfer point P2 and transfers the conveyor element 4 to the second conveyor unit 2b, 2b'. Subsequently, the cam element 3a, 3a' experiences an acceleration which is increased from a time t=0.8 s. At time t=3 s, the gripping device 3b, 3b' of the cam element 3a, 3a' is at the first transfer point P1 and takes over the conveyor element 4 from the first conveyor unit 2a. The cam element 3a, 3a' is decelerated before it undergoes renewed acceleration from time t=3.4 s, which is reduced from time t=4.4 s. At time t=6 s, the gripping device 3b, 3b' of the cam element 3a, 3a' reaches the second transfer point P2 and transfers the conveyor element 4 to the second conveyor unit 2b, 2b'.

Figure 4:
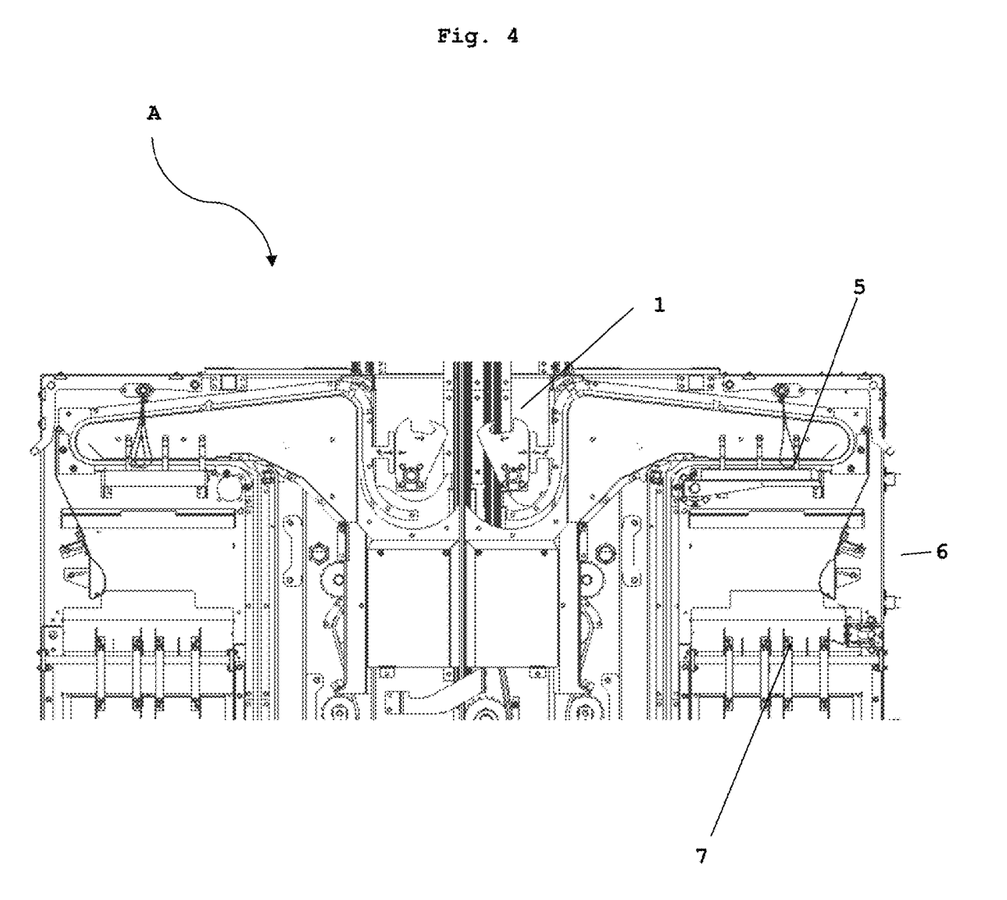

FIG. 4 shows a schematic view of an embodiment of a plant A according to the invention for the production of elongated pasta. The plant A comprises a conveyor system 1 according to the invention, here in the embodiment according to FIG. 1. The plant 1 according to FIG. 4 has only one cutting module on the right side of the conveyor system 1, but can be upgraded with an additional cutting module on the left side of the conveyor system 1.

The plant, known per se, comprises a deposit table 5 to which the elongated pasta products are transported from the conveyor system 1. Below the deposit table 5 is the discharge belt/chain 7 of the cutting machine 6. The uncut product then arrives on the discharge belt/chain 7 and is conveyed from the discharge belt/chain 7 through a cutting unit (e.g. with rotating knives—not shown) out of the plant A and is cut thereby.

LIST OF REFERENCE SIGNS

A: Plant for the production of elongated pasta
1: Conveyor system (1) for a plant for the production of elongated pasta products
2a: First conveyor unit
2a1: Carrier of the first conveyor unit
2b, 2b': Second conveyor unit
2b1, 2b1': Carrier of the second conveyor unit
3: Transfer unit
3a, 3a': Cam element
3b, 3b': Gripping device of the cam element
3c, 3c': Guide element
3d, 3d': approximately circular segment-shaped surface section of the guide element
4: Conveyor element
5: Deposit table
6: Cutting machine
7: Discharge belt/chain
P1: First transfer point
P2: Second transfer point

The invention claimed is:

1. A conveying system for a plant for producing elongated pasta, the conveying system comprising a first conveyor unit and a second conveyor unit as well as a transfer unit for transferring conveyor elements from the first conveyor unit to the second conveyor unit, wherein the transfer unit comprises a first and a second rotatably mounted cam element, each with a gripping device, and a first and a second fixedly arranged guide element, each guide element having a surface section, wherein the first cam element and the first guide element are arranged relative to each other in such a way that a conveyor element taken over by the gripping device of the first cam element from the first conveyor unit can be moved by rotation of the first cam element along the surface section of the first guide element to a position where the conveyor element can be taken over by the second conveyor unit which is assigned to the first cam element, and the second cam element and the second guide element are arranged relative to each other in such a way that the conveyor element taken over by the gripping device of the second cam element from the first conveyor unit can be moved by rotation of the second cam element along the surface section of the second guide element to a position where the conveyor element can be taken over by an additional second conveyor unit which is assigned to the second cam element, and wherein the first and second cam elements as well as the first and second guide elements are arranged axially symmetrically around an axis through the first conveyor unit.

2. The conveying system according to claim 1, wherein the first cam element and the first guide element and the second cam element and the second guide element are arranged with respect to one another in such a manner that a conveyor element taken over by the gripping device of the respective cam element from the first conveyor unit can be moved by rotation of the respective cam element along the surface section of the respectively associated guide element to a position where the conveying element can be taken over by the respective second conveyor unit.

3. The conveying system according to claim 1, wherein the cam element(s) as well as the first conveyor unit and the second conveyor unit(s) can be moved in coordination with each other in such a way that a continuous transfer of the conveyor element from the first conveyor unit to the second conveyor unit can be performed.

4. The conveying system according to claim 1, wherein the first conveyor unit is a pendulum chain.

5. The conveying system according to claim 1, wherein the second conveyor unit(s) is a stripper chain for conveying the conveyor element to a delivery table of a cutting machine.

6. A plant (A) for producing elongated pasta, comprising a conveying system according to claim 1.

7. A method of conveying elongated pasta, with the conveying system according to claim 1, comprising the steps of:
  a) conveying the conveyor element, which carries the elongated pasta, by means of the first conveyor unit to a first transfer point,
  b) takeover of the conveyor element from the first conveyor unit by the transfer unit and conveying of the conveyor element to a second transfer point,
  c) takeover of the conveyor element at the second transfer point from the transfer unit by the second conveyor unit, wherein in step b) the conveyor element is taken over at the first transfer point by the gripping device of the respective cam element of the transfer unit, and the conveying of the conveyor element to a second transfer point takes place along the surface section of the respective guide element of the transfer unit.

8. The method according to claim 7, wherein the rotational speed of the respective cam element and the conveying speeds of the first conveyor unit and of the second conveyor unit are matched to one another in such a way that, at the first transfer point and at the second transfer point, the gripping device can pick up the conveyor element from the first conveyor unit and deliver it to the second conveyor unit, respectively, in a continuous process.

9. The method according to claim 7, wherein the conveyor element is transported from the second conveyor unit to a cutting machine.

10. The method according to claim 7, wherein conveyor elements conveyed by the first conveyor unit are alternately taken over by the first cam element or the second cam element and conveyed to a corresponding second conveyor unit.

11. The method according to claim 10, wherein the movement of the first cam element and the second cam element is coordinated such that the first cam element does not collide with the second cam element.

12. The method according to claim 10, wherein the conveying speed of the first conveyor unit is 50% of the rotational speeds of the cam elements, the cam elements rotating in opposite directions at the same speed.

13. The method according to claim 10, comprising, in the event of a malfunction of either a first conveyor path associated with the first cam element or a second conveyor path associated with the second cam element, stopping the rotation of the cam element that is associated with the malfunctioning conveyor path and taking over said conveyor elements by the cam element associated with the functioning conveyor path.

14. The method according to claim 13, wherein in the event of a malfunction, the conveying speed of the first conveyor unit is reduced by 50%.

* * * * *